April 14, 1936.  R. N. ROBERTSON  2,037,046
CARTRIDGE PACKING
Filed March 29, 1933

INVENTOR:
Ralph N. Robertson
By E. J. Andrews
Att'y.

Patented Apr. 14, 1936

2,037,046

UNITED STATES PATENT OFFICE 2,037,046

CARTRIDGE PACKING

Ralph N. Robertson, Pittsburgh, Pa.

Application March 29, 1933, Serial No. 663,279

2 Claims. (Cl. 286—1)

The invention relates to cartridge packing for shafts and the like, and it has for its object providing a cartridge which contains the various packing elements assembled as they are to be inserted in the chamber of the stuffing-box head and arranged as independent units which may be assembled in the factory and transported wherever desired, entirely independently of the machine with which they are to be used. They may then be inserted in the chamber to be packed, either in new machines, or by substituting them for old packing.

Figure 1:
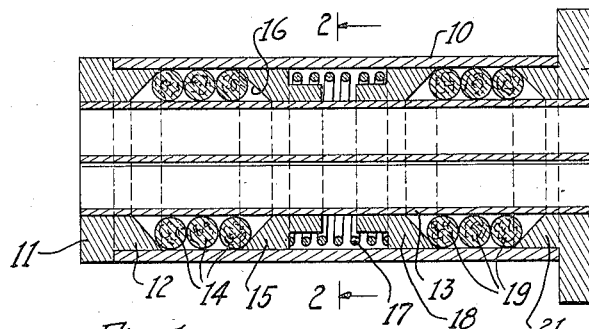
Figure 2:
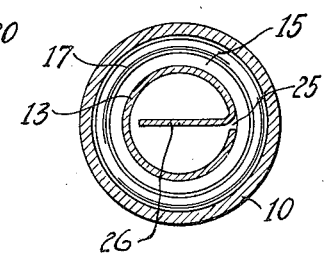
Figure 3:
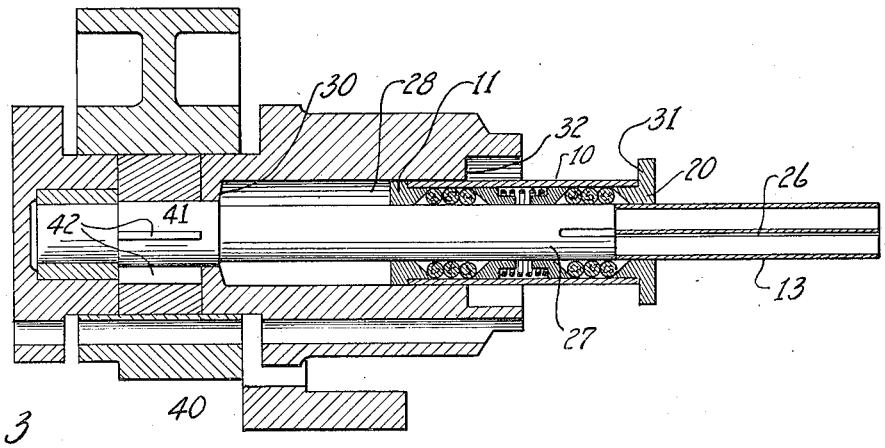
Figure 4:
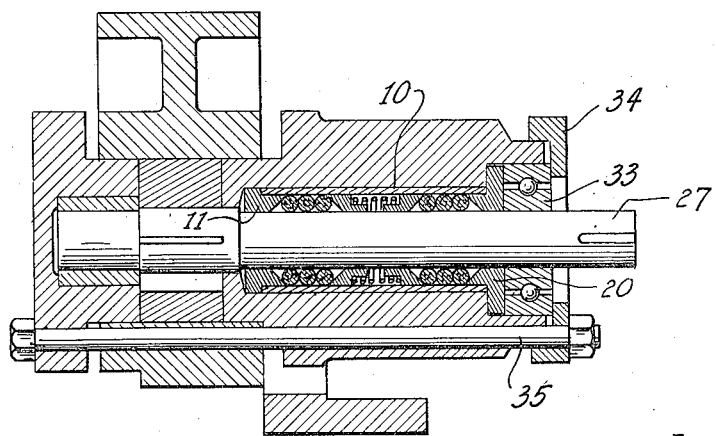

Of the accompanying drawing, Fig. 1 is a central sectional view of the cartridge which embodies the features of my invention; Fig. 2 is a sectional view along the line 2—2 of Fig. 1; Fig. 3 is a central sectional view of a machine with a shaft which is to receive the cartridge packing, together with the packing, much reduced, which is being inserted in the machine; and Fig. 4 is a central sectional view of the machine and packing entirely assembled.

The cartridge packing illustrated may be applied to shafts, valve stems, spindles, or the like, of any machine, valve or other apparatus, so as to provide suitable packing means to prevent leakage and, if desired, provide the bearing also for the stem. The cartridge comprises an enclosing tube 10 which has a ring member 11 with an annular shoulder 12 which is pressed into the tube 10 so as to be firmly fixed therein, or it may be screwed into the tube, if desired. Within the ring 11 is passed a supporting tube 13 which is adapted to support the packing members which are passed between the walls of the two tubes 10 and 13. These packing members may be formed and arranged as may be desired. For instance, in this case, I show packing rings 14 which are passed between the two tubes, fitting snugly therein. A ring member 15 is then passed in, and this member has preferably a bevelled surface 16, which is adapted to press against the packing members so as to force them snugly against the tube 13. I prefer to insert a compression spring 17 and then a ring 18, followed by packing rings 19, and finally the chamber between the tubes is closed by a member 20 having an annular tapering shoulder 21. The shoulder is forced into the outer tube 10 or threaded therein, as desired, and the packing members 19 and the spring 17 are materially compressed by the end member 20. In this manner, the spring 17 is continually pressing against the rings 15 and 18, thus tending to force the packing members 14 and 19 firmly against the tube 13.

The tube 13 is preferably compressible. For this purpose, I form the tube as indicated in Fig. 2, with an opening 25 to allow some compression thereof, so that the tube may be fairly easily removed from the cartridge. I also provide a partition 26 in the tube which assists in forcing the tube out from the cartridge when the cartridge is to be inserted on the shaft. The partition 26 also assists in preventing abnormal collapsing of the tube 13 during the installing operation or at any other time.

The method of inserting the cartridge consists in passing the ring 11 over the outer end of the shaft 27 which is to be packed and, at the same time, the tube 13 is pressed out from the cartridge. Ordinarily, the end of the shaft presses against the outer wall of the tube, but the partition 26 assists in this action as it passes across the end of the shaft. The cartridge is in this way passed onto the shaft, and the ring 11 is passed into the chamber 28 until it reaches the bottom of the chamber and strikes against the shoulder 30. If suitable for the purpose, the shoulder 31 of the outer ring 20 will then coact with the end 32 of the chamber wall and, in the meantime, the tube 13 will be forced entirely out of the cartridge. The bearing 33 may then be inserted and held in place by means of a ring 34 and bolts 35, or in any other suitable manner.

It will thus be seen that I have provided a cartridge which is in all respects self-contained, and the elements of which cannot be disarranged in transporting or otherwise, and a cartridge that can be transported as desired and very conveniently inserted in the chamber which is to be packed, it being understood that the cartridge is formed to the shape and dimensions of the chamber. It will also be obvious that the cartridge can be inserted not only in new machines, but can be substituted for packing of any kind in old machines, providing only the dimensions are suitable. If used for valve packing, or the like, the packing itself may form both the bearing and the lubricating means.

The cartridge is applicable to any machine or apparatus. For illustration, however, I have shown it applied to the shaft 27 of a rotary pump 40. This pump comprises, in addition to the shaft 27, a rotor 41 fixed to the shaft, and the rotor has driving blades 42. In operation, pressure, materially greater than atmospheric pressure, is produced in the rotor chamber, and the packing prevents leakage of the fluid. The details of the pump, however, are in no sense a part of my invention. When the packing becomes worn, so as to allow harmful leakage, the cartridge may be removed and replaced by a new one, or an inner tube 13 can be inserted in the old cartridge and the old packing can then be suitably renewed.

I claim as my invention:

1. A packing cartridge comprising an outer tube, an annulus mounted in each end of the tube, an inner tube mounted in the outer tube and extending into each annulus, packing material mounted between the tubes, the inner tube comprising a metal sheet bent to form a tubular portion with one edge extending diametrically inwardly from a line of the tubular wall to a line adjacent the opposite side of the tube.

2. A packing cartridge comprising an outer tube, an annulus fixed in one end of the tube, an inner tube mounted in the outer tube and the bore of the annulus, packing material mounted between the tubes, an annulus mounted in the other end of the outer tube and encircling the inner tube, the inner tube having an opening in its wall and extending from one end to the other thereof, the edges of the opening being spaced apart circumferentially but having substantially equal radii, and a member fixed to one edge of the opening of the inner tube and extending diametrically inwardly to a point adjacent the opposite wall of the tube.

RALPH N. ROBERTSON.